United States Patent
Spohr

(10) Patent No.: US 7,062,981 B1
(45) Date of Patent: Jun. 20, 2006

(54) SENSOR, IN PARTICULAR, A MAGNETOSTRICTIVE OR MAGNETOELASTIC SENSOR

(75) Inventor: Hans-Hermann Spohr, Calw (DE)

(73) Assignee: Wittenstein GmbH & Co. KG., Igersheim (DE)

( * ) Notice: Subject to any disclaimer, the term of this patent is extended or adjusted under 35 U.S.C. 154(b) by 0 days.

(21) Appl. No.: 09/979,473

(22) PCT Filed: Feb. 29, 2000

(86) PCT No.: PCT/EP00/01678

§ 371 (c)(1),
(2), (4) Date: Oct. 6, 2003

(87) PCT Pub. No.: WO00/73756

PCT Pub. Date: Dec. 7, 2000

(30) Foreign Application Priority Data

May 26, 1999 (DE) .............................. 199 24 002

(51) Int. Cl.
  *G01L 3/02* (2006.01)
  *G01L 3/10* (2006.01)
  *G01L 3/12* (2006.01)
  *G01L 3/14* (2006.01)

(52) U.S. Cl. .................................. 73/862.333
(58) Field of Classification Search ........... 73/862.333, 73/862.335, 779, 862.69, 862.325, 204.26
See application file for complete search history.

(56) References Cited

U.S. PATENT DOCUMENTS

| 3,782,187 | A | * | 1/1974 | Dahle ...................... 73/862.69 |
| 4,506,554 | A | * | 3/1985 | Blomkvist et al. ...... 73/862.335 |
| 4,817,444 | A | * | 4/1989 | Yagi et al. ............. 73/862.335 |
| 4,825,709 | A | * | 5/1989 | Nordvall .................. 73/862.69 |
| 5,437,197 | A | * | 8/1995 | Uras et al. ............... 73/862.69 |
| 6,330,833 | B1 | * | 12/2001 | Opie et al. ............. 73/862.333 |
| 6,467,360 | B1 | * | 10/2002 | Bogdanov .............. 73/862.333 |
| 6,622,577 | B1 | * | 9/2003 | Uras ........................ 73/862.69 |

* cited by examiner

*Primary Examiner*—Max Noori
*Assistant Examiner*—Octavia Davis
(74) *Attorney, Agent, or Firm*—Bachman & LaPointe, P.C.

(57) ABSTRACT

The invention relates to a sensor, in particular, a magnetostrictive or magnetoelastic sensor, comprising at least one core element which consists of a ferromagnetic material. Said core element is at least partially surrounded by at least one coil. The core element or elements are placed into a housing which is subjected to tensile and/or pressure forces, in order to determine the moment of force and/or the torque.

5 Claims, 3 Drawing Sheets

SENSOR, IN PARTICULAR, A MAGNETOSTRICTIVE OR MAGNETOELASTIC SENSOR

BACKGROUND OF THE INVENTION

The present invention relates to a sensor, in particular a magnetostrictive or magnetoelastic sensor, having at least one core element which is composed of a ferromagnetic material and is at least partially surrounded by at least one coil.

Sensors such as these are known and available commercially in a very wide range of forms and configurations. They are primarily used for measuring forces, force changes and torques, and for determining changes in them.

They are frequently used as sensors for measuring torques in shafts, or as force pick-ups.

By way of example, DE 38 19 083 A1 describes a magnetoelastic force measurement apparatus, with an annular coil being fitted to a pressure ring body. In this case, a likewise magnetostrictive tension sleeve body with a corresponding annular coil is arranged coaxially in the pressure ring body, so that, when force is introduced, one body is stressed in compression, and the other body is stressed in tension. This has the disadvantage that the corresponding coaxial configuration means that the sensor is difficult to use and to operate. In particular, it cannot be designed to be very small, and thus cannot be used universally.

Furthermore, its design is complex, and it is expensive to produce.

DE 196 05 096 discloses a torque sensor and a stress detection element, in which a core component having a magnetostrictive winding is provided on a rotating shaft, in particular bridging a gap.

This has the disadvantage that such a torque sensor can be provided only for specific shafts, and must be specifically matched to each component.

SUMMARY OF THE INVENTION

The present invention is based on the object of providing a sensor of the type mentioned initially, which overcomes said disadvantages and by means of which it is possible to determine a force and/or a torque as well as any change in a simple and cost-effective manner. In this case, it is intended to be possible to use the sensor and, in particular, its components permanently in the widest possible range of environments.

Furthermore, the installation size and production costs are intended to be reduced, with the life at the same time extend and with the aim at the same time improving the reliability, with greater accuracy.

In order to achieve this object, the at least one core element is inserted into a housing on which tension and/or compression forces act for force and/or torque determination.

In the case of the present invention, it is of elementary importance that all the components of the sensor, such as core elements and coil elements, are inserted into a housing. Appropriate forces which are to be determined as well as a magnetic return path can then act on the housing by virtue of the guidance of the magnetic field or torques. A magnetic return path can also be provided via the housing and the encapsulation of the coil elements. In consequence, the sensor and, in particular, its components are protected. At the same time, such a sensor ensures universal use in widely differing technical fields.

A magnetostrictive material is preferably used as the core element. The material Terfenol-D has been found to be particularly suitable. The magnetic characteristics of this material vary when a force acts on it. This change in the magnetic field can be determined by means of a magnetic alternating field, which is applied by means of the coils around the core element. In consequence, the coil has a specific impedance, which determines the current that flows through the coil. If a specific force acts on the core element, then its magnetic characteristics, essentially its relative permeability, change. This change influences the magnetic field and hence the impedance. These changes can be measured as currents or voltages.

In order to measure compression and/or tension forces at the same time, it has been found to be particularly advantageous to insert the core element or the core elements into the housing such that they are prestressed. This allows compression and/or tension forces to be determined in a simple and cost-effective manner. There is therefore no need for any autonomous or independent protection for this purpose.

Furthermore it has been found to be particularly advantageous to insert two core elements, which are arranged in a row, with an intermediate piece between them into a housing, the two core elements each being surrounded by at least one coil. In this case, the housing is sealed tight on the outside.

Force transmitting elements project from the outside inward through the housing to the intermediate piece, and can in this way apply compression and/or tension forces to the core elements.

If one of the two core elements has pressure applied to it, then the opposite, other core element necessarily has tension applied to it.

In consequence, different voltages can be produced in the individual coils, which allow exact conclusions with regard to the forces or torques acting on them.

The idea of the present invention also includes the sensor having at least one associated temperature sensor so that a correction factor can be influenced during operation if, for example, the environment of a sensor has a temperature-dependent response and a temperature change occurs, for example, in the drive. It is thus possible to use a temperature to pre-set a measurement variable, in order to increase the accuracy of the sensor element.

In addition, in a further exemplary embodiment of the present invention, the intention is to provide an individual core element with at least one coil, with covering elements resting against the end faces of the core element. A housing is formed by means of an appropriate cylinder. The cylinder preferably has thin walls. Appropriate compression forces can act directly on the encapsulated core element with the coil, with a voltage change being possible, so that it is also possible to determine the force and/or force change. With this arrangement, it is also possible to insert the core element between the covering elements such that it is prestressed so that tension forces can also act here.

Overall, the present invention provides a sensor which can be produced with very small installed sizes and by means of which exact measurement results can be achieved. In this case, the sensor can be used and installed universally in any desired machine elements without it having to be specified and modified specifically for each installation.

BRIEF DESCRIPTION OF THE INVENTION

Further advantages, features and details of the invention will become evident from the following description of preferred exemplary embodiments and from the drawings, in which.

DETAILED DESCRIPTION OF THE INVENTION

Figure 1:
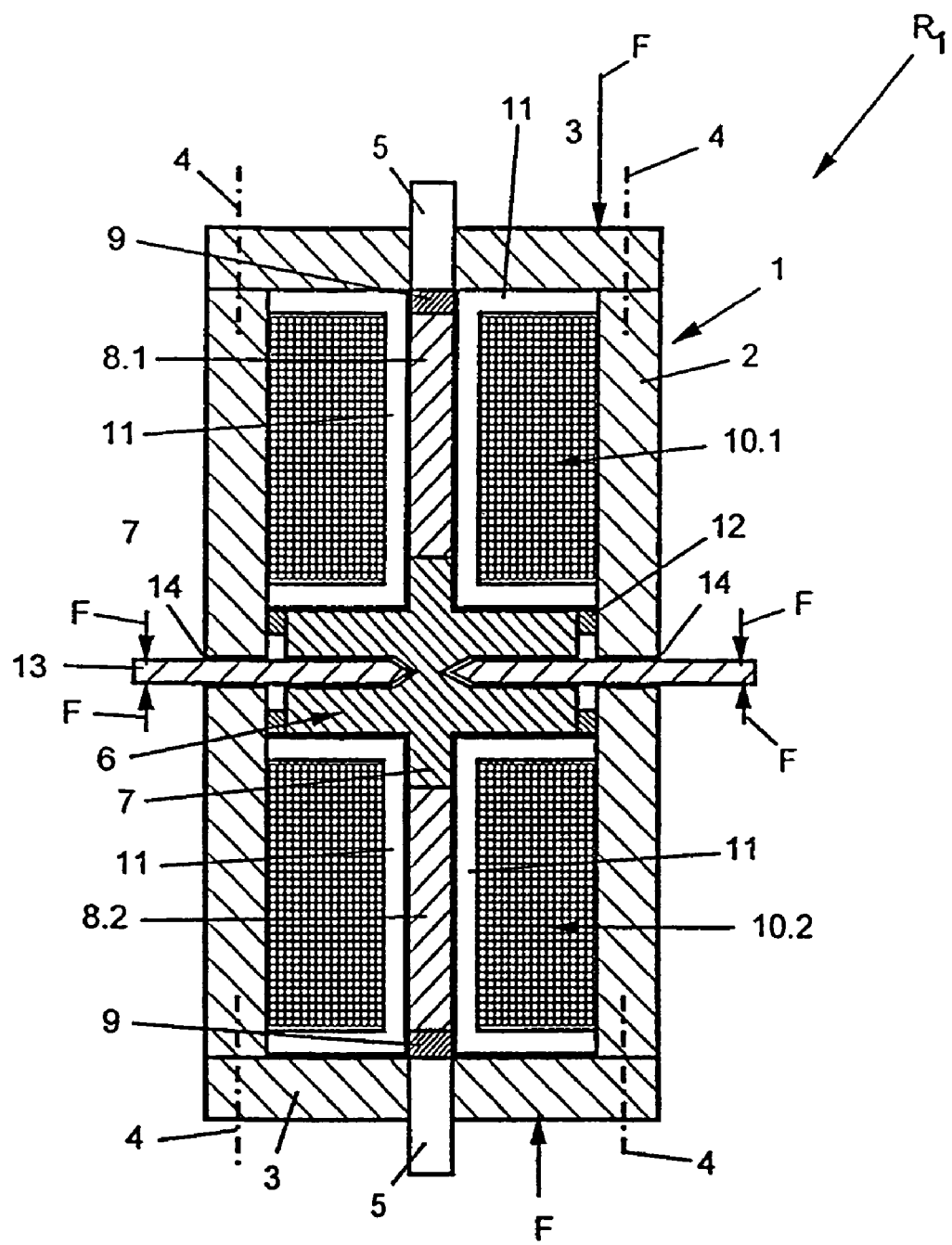
FIG. 1 shows a schematically illustrated longitudinal cross section through a sensor according to the invention for determining tension and/or compression forces.

As shown in FIG. 1, a sensor $R_1$ according to the invention has a housing 1, which, in the preferred exemplary embodiment, comprises a cylinder 2 whose end faces can be closed by covering elements 3. Attachment elements 4, which are represented by dashed lines, can connect the covering element 3 and the cylinder 2 to one another firmly or such that they can be detached again.

Sealing elements or the like (which are not illustrated here in any more detail) can be provided in order to close the housing 1 such that it is completely tightly sealed.

In this case, a welded joint or a screwed connection between the covering element 3 and the cylinder 2 are also intended to be covered within the scope of the invention. The invention is not restricted in this area.

Each covering element 3 or only one of the two covering elements 3 has an associated threaded pin 5, preferably centrally, which, if required, can be fixed in any desired position via a locking nut (which is not illustrated here).

An intermediate piece 6 is inserted, such that it can move axially, in the housing 1 with pressure being applied to it. The intermediate piece 6 is provided with holding steps 7, which are preferably arranged centrally. A core element 8.1, 8.2 composed of ferromagnetic material is in each case inserted on both sides, adjacent to the intermediate piece 6 between the holding steps 7 and the threaded pin 5.

In the preferred exemplary embodiment, a cylindrical pin 9 is in each case inserted between the core element 8.1, 8.2 and the threaded pin 5.

The threaded pin 5 can be screwed into the housing 1 in very small steps by turning the threaded pin 5 in the covering element 3. This allows prestressing to be applied to the cylindrical pin 9 and, in particular, to the core elements 8.1, 8.2.

The core elements 8.1, 8.2 are surrounded by respective coils 10.1, 10.2. The coils 10.1, 10.2 are preferably kept at a short distance from the intermediate piece 6 and from the core elements 8.1, 8.2 themselves via coil formers 11, so that a slight, infinitesimal axial movement of the core elements 8.1, 8.2 and of the intermediate piece 6 is possible.

The intermediate piece 6 is preferably guided within a sleeve 12.

At the same time the sleeve 12 in each case forms an end-face stop for the two coils 10.1, 10.2 and for the coil former 11, so that their end faces are in each case kept at a distance from one another in the housing 1, while they rest against the covering elements 3 and are supported there.

Force transmitting elements 13 act through an opening 14 in the housing 1 on the intermediate piece 6, so that a force F, in the form of a tension force and/or a compression force, can be applied to them from the outside, in particular from outside the housing 1. In particular, this allows a specific force F to be applied as a compression force and/or as a tension force to the sensor $R_1$, and to be determined by comparison of the coil voltages.

Appropriate opposing bearings, which are not shown here, can absorb the force F on the end faces in the region of the covering elements 3. Thus, for example, a force F can be introduced into the sensor by means of a sleeve or a similar element.

A voltage is applied to both coils 10.1, 10.2, which is changed by a change in the magnetic field, due to a change in the core element 8.1, 8.2 caused by the application of pressure and/or tension. This measurable change can then be converted appropriately to a resultant force or torque.

Another advantage of the present sensor is that the housing 1 is completely closed, so that no dirt or the like can enter it.

A further advantage is that such a sensor $R_1$ can be used permanently at any desired point, for example on a transmission or some similar electromechanical or electromagnetic drive, in particular also in the field of handling technology and robotics.

The housing 1 offers mechanical and thermal protection against contamination, oil or the like, by means of the appropriate encapsulation.

In particular, it is also important that the core elements 8.1, 8.2 are arranged in the sensor housing 1 such that they are prestressed in order that, for example, when a compression force is applied to the force transmitting element 13, a stress change can be produced on the one hand in the one core element 8.2 and, in particular, in the corresponding coil 10.2, in which case a change in the voltage on the coil 10.1 can be determined at the same time by subtracting the prestress in the other force element 8.1.

Furthermore, it is intended to operate one of the two coils 10.1 or 10.2 as an exciter coil, and the other as a measurement coil. A voltage difference can be determined by superimposing the corresponding coil voltages. This provides a direct conclusion of the applied or varying force, or the corresponding torque.

Figure 2:
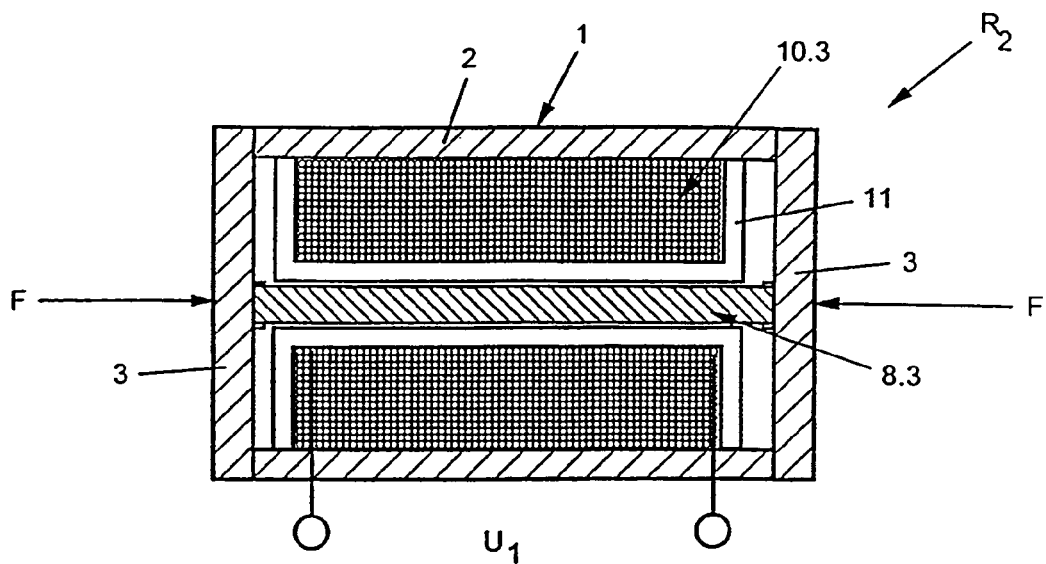
FIG. 2 shows a schematically illustrated longitudinal cross section through a further exemplary embodiment of a sensor according to the invention.

The exemplary embodiment of the present invention illustrated in FIG. 2 shows a sensor $R_2$ which has a core element 8.3 which is surrounded by a coil 10.3 with a coil former 11. In this case, the end faces of the core element 8.3 are supported on the covering element 3.

The core element 8.3 may be held radially on the covering element 3, or may be inserted into a corresponding recess.

Electrical cables, which are not particularly annotated here, connect the coil 10.3 to a voltage source $U_1$.

In this case, the core element 8.3 and the coil 10.3 are arranged in a cylinder 2, which can be connected to the covering element 3 in the manner described above.

It has been found to be advantageous for the cylinder 2 to be particularly thin and to be composed of a very soft, and possibly elastic, material, so that compression forces F acting from the outside on the covering element can be transmitted to the core element 8.3 without influencing the material of the cylinder 2. The cylinders 2 may thus be very small, so that a housing 1 is formed which just surrounds the core element 8.3 with the covering elements 3 like encapsulation.

In this case, it is intended that the electrical connections be passed through the housing 1, either through the cylinder 2 or through the covering element 3, and that a corresponding contact point be sealed.

Such an encapsulated sensor $R_2$ has the major advantage that it can be used anywhere, at any desired points for example in a drive, without having to provide a separate housing, seal, compartmentalization or the like.

Furthermore, it is also intended for the core element 8.3 of the sensor $R_2$ to be inserted between the covering elements 3 such that it is prestressed. Corresponding tension forces can then also act on the sensor $R_2$, and can be measured and determined in a corresponding manner via the voltage change. This is likewise within the scope of the present invention.

Figure 3:
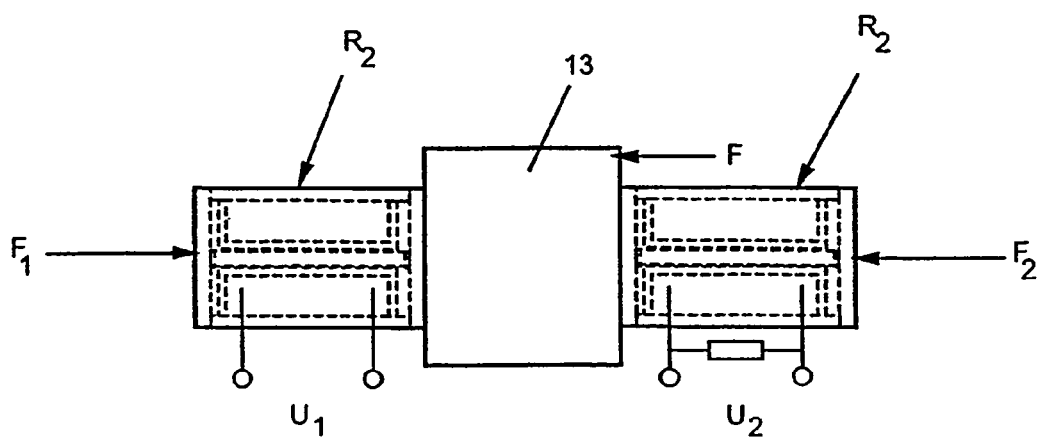
FIG. 3 shows one possible arrangement of individual sensors as shown in FIG. 2 for determining forces and/or torques.

In the exemplary embodiment of the present invention, as shown in FIG. 3, two sensor elements $R_2$ are connected to any desired external force transmitting element 13 on which, for example, a force F acts. Prestressing forces $F_1$ and $F_2$ may be applied at the end face at the other end.

The two voltages U1 and U2 on the two sensors $R_2$ change when a force F acts on the force transmitting element 13. This voltage change likewise allows a torque and/or a force and/or a force and torque change to be determined. This arrangement is likewise intended to be covered by the present idea of the invention.

Figure 4:
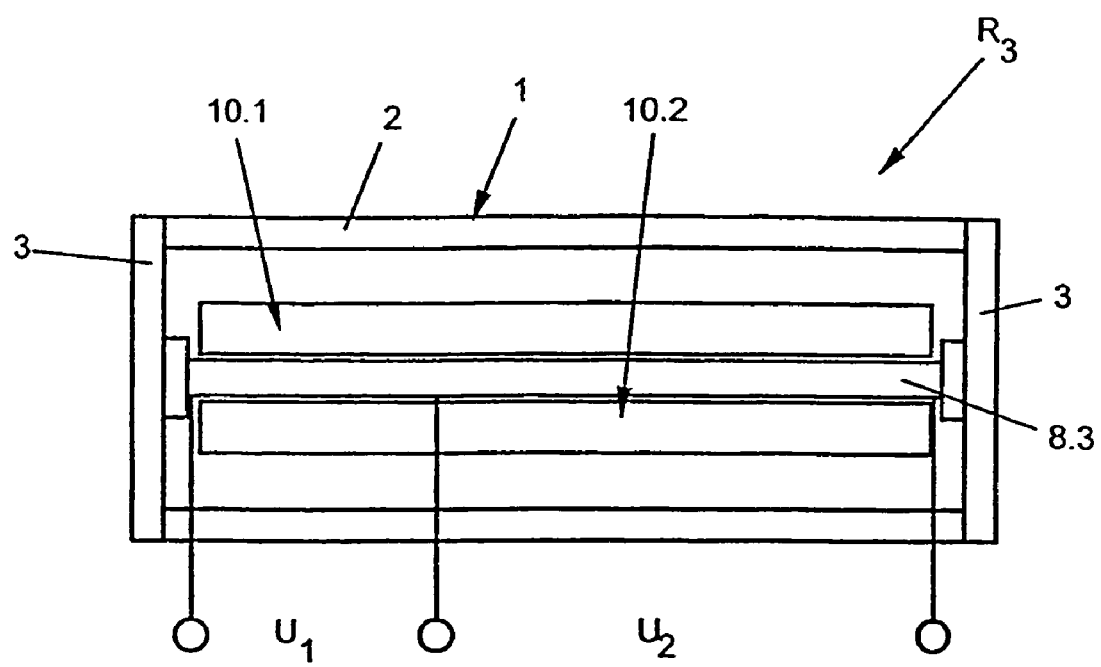
FIG. 4 shows a schematically illustrated longitudinal cross section through a further exemplary embodiment of the sensor illustrated in FIG. 2.

The exemplary embodiment of the present invention illustrated in FIG. 4 shows a sensor $R_3$, whose design corresponds essentially to that of the sensor shown in FIG. 2. However, in this case, two coils 10.1, 10.2 are fitted onto the core element 8.3, and their voltages U1, U2 can be measured when an appropriate force and/or torque acts on them. In this case, one of the two voltages may be an exciter voltage, and the other may be the measurement voltage.

The invention claimed is:

1. A sensor comprising at least two core elements (8.1 to 8.3) which are composed of a ferromagnetic material and are at least partially surrounded by at least one coil (10.1 to 10.3), wherein the two core elements (8.1, 8.2) are inserted into a housing (1), arranged in a row one behind the other, in which case external tension and/or compression forces can be introduced axially via an intermediate piece (6) which is arranged between the two core elements (8.1, 8.2), the intermediate piece (6) has at least one associated force transmitting element (13), which projects radially out of the housing (1) and can move infinitesimally axially in an opening (14) in the housing (1).

2. The sensor as claimed in claim 1, wherein the intermediate piece (6) is arranged such that it can move axially in the housing (1).

3. The sensor as claimed in claim 1, wherein the intermediate piece (6) is arranged such that it can move axially with respect to the coils (10.1, 10.2) in the housing (1).

4. The sensor as claimed in claim 1, wherein the intermediate piece (6) has a holding step (7) on which end faces of the core elements (8.1, 8.2) are mounted.

5. The sensor as claimed in claim 1, wherein the intermediate piece (6) is mounted such that it can move axially within a sleeve (12) in the housing (1), with the end faces of the sleeve (12) each keeping coils (10.1, 10.2) which are fitted to the two core elements (8.1, 8.2) at a distance from one another and fixing them in the housing (1).

\* \* \* \* \*